(12) United States Patent
Holmgren et al.

(10) Patent No.: US 7,097,244 B2
(45) Date of Patent: Aug. 29, 2006

(54) THERMAL PROTECTION APPARATUS AND METHOD FOR CHILD CAR SEAT

(76) Inventors: Keri A. Holmgren, 259 S. 1050 West #80, Provo, UT (US) 84601; Shelby K. M. Smith, P.O. Box 816, Castle Dale, UT (US) 84513

( * ) Notice: Subject to any disclaimer, the term of this patent is extended or adjusted under 35 U.S.C. 154(b) by 0 days.

(21) Appl. No.: 10/661,950

(22) Filed: Sep. 12, 2003

(65) Prior Publication Data

US 2004/0056013 A1    Mar. 25, 2004

(51) Int. Cl.
*A47C 31/00*    (2006.01)
(52) U.S. Cl. .............................. 297/219.12; 297/228.12
(58) Field of Classification Search ........... 297/219.12, 297/229, 228.13, 184.13, 184.11
See application file for complete search history.

(56) References Cited

U.S. PATENT DOCUMENTS

| | | | |
|---|---|---|---|
| 2,601,881 A | 7/1952 | Oberlin, Sr. | |
| 4,102,377 A | 7/1978 | Ostrem | |
| 4,118,066 A | 10/1978 | Ricke ......................... 297/184 |
| 4,304,824 A * | 12/1981 | Karpinski .................... 428/69 |
| 4,342,203 A | 8/1982 | Moore | |
| 4,458,738 A | 7/1984 | Wilson | |
| 4,685,499 A | 8/1987 | Black | |
| 4,725,094 A * | 2/1988 | Greer ......................... 297/229 |
| 4,877,288 A * | 10/1989 | Lee ............................. 297/229 |
| 4,885,200 A * | 12/1989 | Perdelwitz et al. ......... 428/136 |
| 4,993,281 A | 2/1991 | Miller | |
| 5,010,610 A * | 4/1991 | Ackley ........................... 5/691 |
| 5,014,570 A | 5/1991 | Fogertey, Jr. | |
| 5,074,165 A | 12/1991 | Keller | |
| 5,131,290 A | 7/1992 | Atinson | |
| 5,150,945 A | 9/1992 | Aupperlee et al. .......... 297/184 |
| 5,157,986 A | 10/1992 | Keller | |
| 5,168,590 A * | 12/1992 | O'Sullivan ..................... 5/490 |
| 5,243,724 A * | 9/1993 | Barnes .......................... 5/482 |
| 5,275,463 A * | 1/1994 | Rocha ......................... 297/229 |
| 5,297,304 A * | 3/1994 | O'Sullivan ..................... 5/630 |
| 5,353,453 A * | 10/1994 | Naumann ...................... 5/417 |
| 5,441,789 A * | 8/1995 | Walker ......................... 428/78 |
| 5,549,354 A | 8/1996 | Rosen ................... 297/184.13 |
| 5,572,757 A * | 11/1996 | O'Sullivan ..................... 5/636 |
| 5,833,309 A | 11/1998 | Schmitz ................. 297/180.11 |
| 5,956,767 A * | 9/1999 | Imm .............................. 2/69.5 |
| 6,012,189 A * | 1/2000 | Dudley ........................... 5/655 |
| 6,030,034 A * | 2/2000 | Plohetski ............... 297/188.06 |
| 6,036,261 A | 3/2000 | Woods et al. .......... 297/184.13 |
| 6,039,393 A | 3/2000 | Roh ...................... 297/184.13 |
| 6,088,856 A * | 7/2000 | Boyer ............................ 5/644 |

(Continued)

*Primary Examiner*—Peter M. Cuomo
*Assistant Examiner*—Sarah B. McPartlin
(74) *Attorney, Agent, or Firm*—Steve McDaniel

(57) ABSTRACT

A thermal protection device shaped and sized to substantially cover a child car seat is placed within an interior portion of the child car seat to form an air pocket and thereby thermally protect the child car seat. In one embodiment, the thermal protection device includes a thermal barrier, and a positioning strap. The thermal barrier includes a reflecting layer configured to reflect radiant energy, an insulating layer configured to provide thermal resistance, and in one embodiment, an absorbing layer configured to absorb radiant energy. In one embodiment, a pouch configured to detachably connect to the flexible washable thermal barrier contains a temperature moderation device. The pouch is preferably located within the air pocket at a location that facilitates temperature moderation of the interior portion of the child car seat particularly those components that may contact an occupant.

1 Claim, 7 Drawing Sheets

U.S. PATENT DOCUMENTS 6,135,635 A * 10/2000 Miller et al. .................. 383/2
6,394,543 B1 * 5/2002 Dunne et al. .......... 297/219.12
6,726,277 B1 4/2004 Samaha
2003/0144410 A1 * 7/2003 Vogt et al. .................. 524/558

* cited by examiner

THERMAL PROTECTION APPARATUS AND METHOD FOR CHILD CAR SEAT

BACKGROUND OF THE INVENTION

1. The Field of the Invention

The invention relates to devices, methods, and systems for protecting automobile car seats. Specifically, the invention relates to devices, methods, and systems for thermally protecting child car seats.

2. The Relevant Art

Child car seats are often subject to harsh conditions within vehicle interiors. For example, child car seats maybe situated for extended periods within parked vehicles located on asphalt parking lots with little or no shade on hot, sunny days. The parked vehicles may be locked with the windows rolled up, resulting in extreme heat buildup within the vehicle. Often sunlight strikes the interior portion of the child car seat and heats up components such as buckles that are dark in color and retain considerable heat. Upon occupation by a child, plastic or metal parts may transfer the heat to exposed skin relatively efficiently, resulting in burns or extreme discomfort by a child, who may already be uncomfortable due to the hot weather and other conditions associated with excursions from home.

Conversely, a vehicle containing a child car seat may sit unprotected overnight near a residence exposed to subzero conditions. Upon entry by the passengers, the vehicle may require an extended period to heat up, before which precious heat may be absorbed by the plastic or metal components of the child car seat, resulting in discomfort to the child occupant.

What is needed is a device designed to thermally protect the interior portion of an unoccupied child car seat, particularly any components that may contact a child directly. Preferably, such a device would be easily deployed and placed in a storage position during occupancy either above or behind the child car seat. The ability to quickly detach the device for placement within a storage compartment such as a trunk would also be beneficial. Given the messy habits of many children, the ability to wash the device would also be beneficial. The ability to place a temperature moderation device at a useful position, particularly near any components that may contact a child, would also increase the effectiveness of such a thermal protection device.

OBJECTS AND BRIEF SUMMARY OF THE INVENTION

The apparatus and corresponding method of the present invention have been developed in response to the present state of the art, and in particular, in response to the problems and needs in the art that have not yet been fully solved by currently available child car seat protection means and methods. Accordingly, it is an overall object of the present invention to provide an improved apparatus and method for thermally protecting a child car seat.

To achieve the foregoing object, and in accordance with the invention as embodied and broadly described herein in the preferred embodiments, an improved child car seat protection device and corresponding method, are presented. The improved apparatus and method facilitate improved temperature moderation in hot and sunny or cold conditions.

In one embodiment of the present invention, a thermal protection device for an unoccupied child car seat includes a flexible thermal barrier made of an insulating layer configured to provide thermal resistance, a reflecting layer configured to reflect radiant energy, and an absorbing layer configured to absorb radiant energy. The flexible thermal barrier is preferably shaped and sized to substantially cover and thermally protect an interior portion of an unoccupied child car seat. When deployed, the flexible thermal barrier forms an air pocket by substantially isolating the air within the interior portion of a child car seat from the ambient air.

In one embodiment, the flexible thermal barrier is made of appropriate materials such that the thermal protection device is washable and rollable into a storage shape. In certain embodiments, the thermal protection device includes a pouch configured to receive a temperature moderation device. Preferably, the pouch comprises a thermally conductive waterproof material with a water absorbent lining. Within the air pocket provided by the flexible thermal barrier, the temperature moderation device moderates the temperature of the air pocket and thereby the interior surfaces of the child car seat.

In one embodiment, the pouch is detachable from the flexible thermal barrier to facilitate cooling and heating of the temperature moderation device. The fastener used to attach and detach the pouch preferably facilitates placing the pouch and temperature moderation device at a position that is in direct contact with components such as buckles or clips that may come in direct contact with an occupant of the child car seat.

In one embodiment, the thermal protection device includes a positioning strap and fastener that facilitates securing the flexible thermal barrier into multiple storage positions such as above or behind the child car seat. In certain embodiments, the thermal protection device also includes an attachment mechanism configured to detachably connect the flexible thermal barrier to the child car seat and facilitate quick removal therefrom, for example to place the thermal protection device within a storage compartment, such as a trunk.

Preferably, such a device would be easily deployed and placed in a storage position during occupancy either above or behind the child car seat. The ability to quickly detach the device for placement within a storage compartment, such as a trunk, would also be beneficial. Given the messy habits of many children, the ability to wash the device would also be beneficial. The ability to place a temperature moderation device at a useful position particularly near any components that may contact a child would also increase the effectiveness of such a thermal protection device.

The various aspects of the present invention work together to provide a thermal protection device that is usable in a broad range of conditions and effective in preventing burning or freezing of the occupant of a child car seat and convenience to the child care provider. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
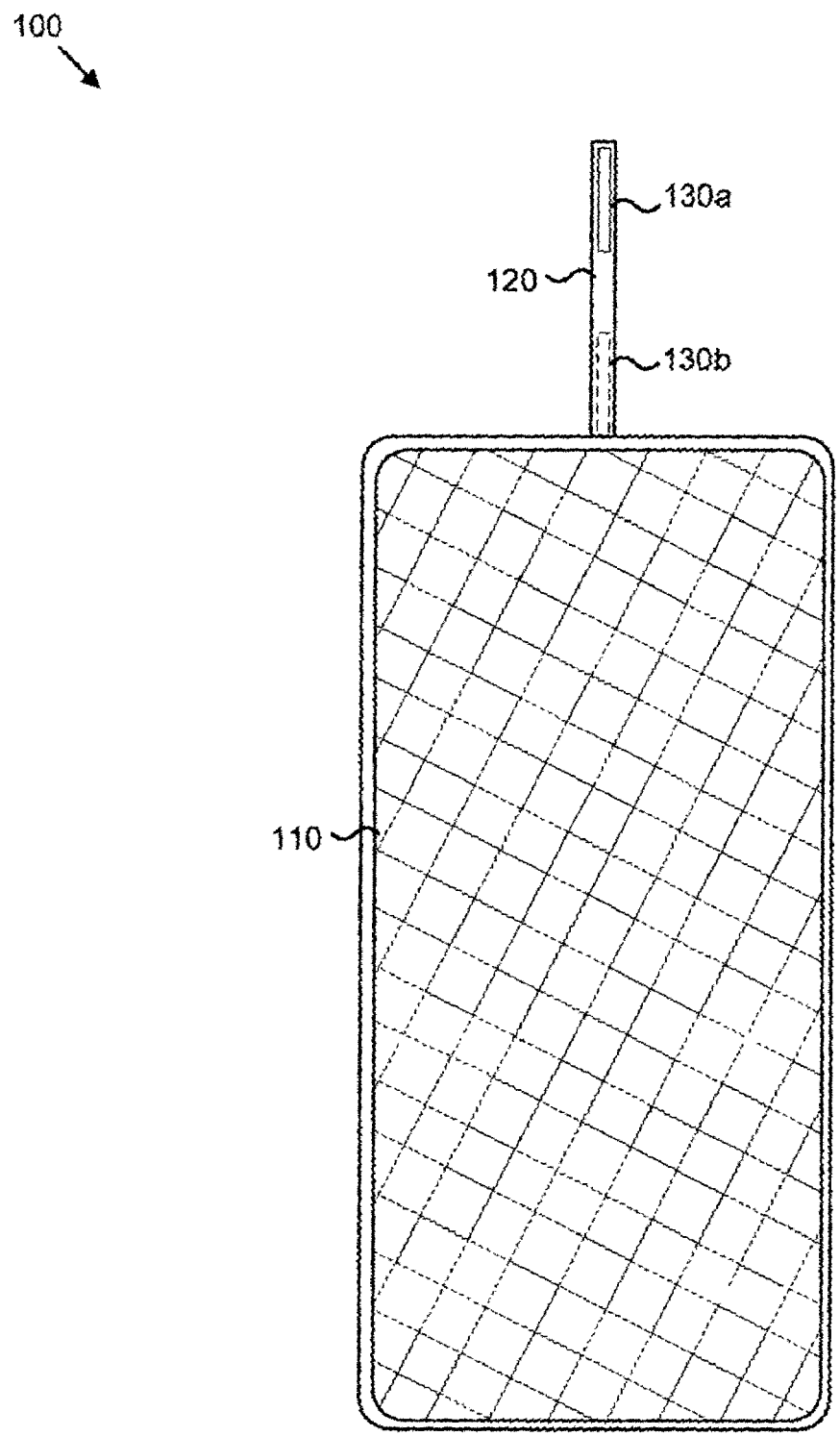
FIG. 1 is a front view illustration of one embodiment of a thermal protection device of the present invention.

FIG. 1 is a front view illustration of one embodiment of a thermal protection device 100 of the present invention. The thermal protection device 100 is designed to provide thermal protection to a child car seat. As depicted, the thermal protection device 100 includes a flexible thermal barrier 110 and a positioning strap 120. The flexible thermal barrier 110 is shaped and sized to cover child car seats in a manner that insulates child car seats from both hot and cold conditions.

The positioning strap 120 includes a fastener 130 used to fasten the thermal barrier into deployed and storable positions. The depicted fastener 130 includes a front portion 130a and a back portion 130b designed to mate and fasten together when rolling the flexible thermal baffler into a storable position. In one embodiment, the front portion 130a and back portion 130b are rectangular patches of hook and loop material respectively.

Figure 2:
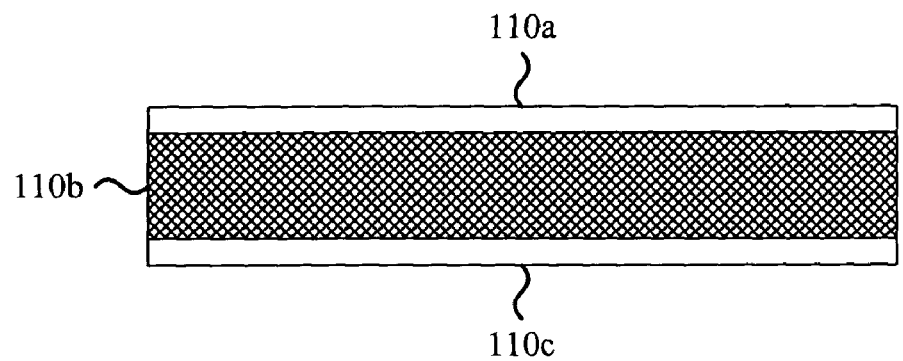
FIG. 2 is a cross sectional view illustration of one embodiment of the thermal protection device of FIG. 1.

FIG. 2 is a cross sectional view illustration of one embodiment of the thermal barrier 110. In the depicted embodiment, the thermal barrier 100 includes a reflecting layer 110a, an insulating layer 110b, and an absorbing layer 110c. The reflecting layer 110a reflects radiant energy such as (infrared) heat and solar radiation. Conversely, the absorbing layer 110c absorbs radiant energy such as (infrared) heat and solar radiation.

The insulating layer 110b provides resistance to thermal conduction and improves the thermal protection provided by the thermal barrier 110. To keep a car seat from getting hot, the thermal barrier 110 is positioned with the reflecting layer 110a facing outward from the car seat. To keep a car seat from getting cold, the thermal barrier 110 is positioned with the reflecting layer 110a facing inward and the absorbing layer 110c facing outward.

Figure 3:
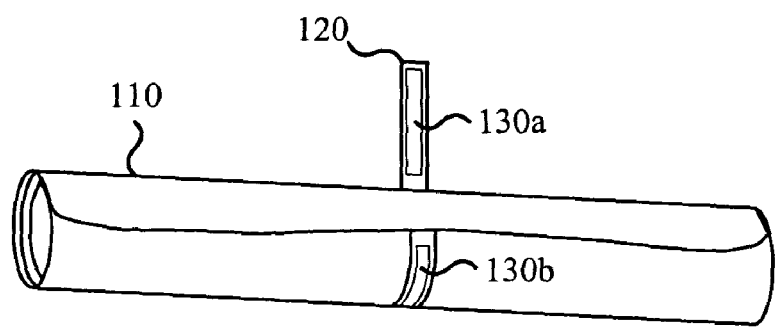
FIG. 3 is an isometric view illustration of the thermal protection device of FIG. 1 rolled into a storable position.

FIG. 3 is an isometric view illustration of the thermal protection device of FIG. 1 rolled into a storable position 300. The flexibility of the thermal barrier 110 facilitates rolling the thermal device 100 into the storable position 300. In the depicted embodiment, the storable position 300 is maintained by mating the front portion 130a and the back portion 130b of the fastener 130. The storable position 300 facilitates placing the thermal device in a storage compartment such as a trunk or in other storage locations some of which will be shown and described below.

Figure 4:
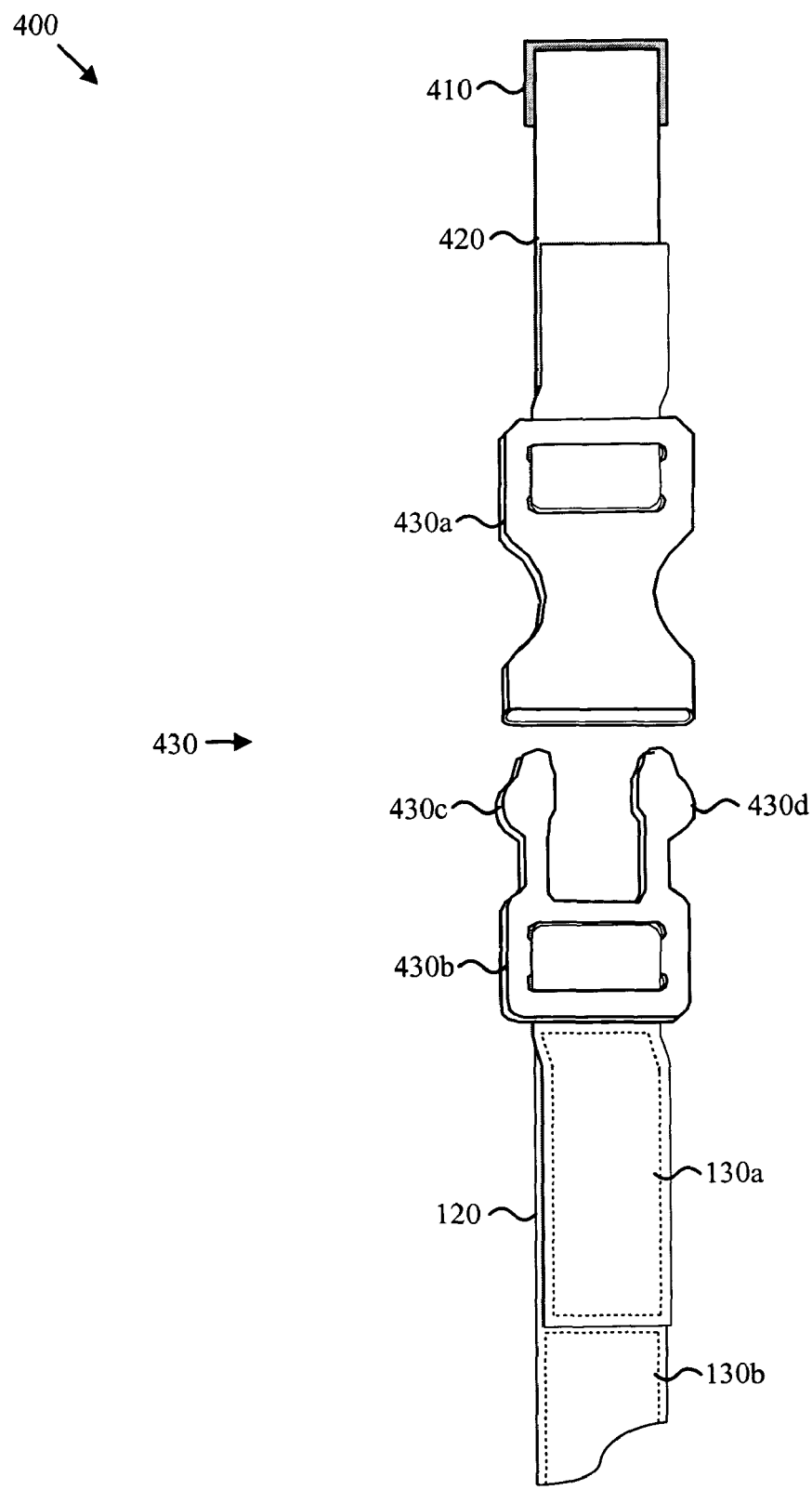
FIG. 4 is a front view illustration of an attachment mechanism of the present invention.

FIG. 4 is a front view illustration of an attachment mechanism 400 of the present invention. The attachment mechanism 400 includes a sticky pad 410, an attachment strap 420, and a buckle 430. The attachment mechanism 400 facilitates quick attachment and detachment of the thermal protection device 100 to and from a child car seat regardless of whether the thermal protection device 100 is rolled up into a storable position or unrolled into a deployable position.

The sticky pad 410 facilitates fixing the attachment means 400 to a car seat. The buckle 430 includes a female connector 430a and a male connector 430b that clip together when the male connector 430b is inserted into the female connector 430a. The buckle 430 is unclipped by pulling apart the female connector 430a and the male connector 430b while squeezing a pair of prongs 430c and 430d.

In the depicted embodiment, the attachment strap 420 is threaded through the female connector 430a and the positioning strap 120 is threaded through the male connector 430b. The length of the attachment mechanism 400 may be adjusted by changing the length of the threaded segment of the attachment strap 420. Changing the length of the attachment mechanism facilitates adjusting the positioning of the thermal barrier 110 relative to the interior portion of a child car seat.

Figure 5:
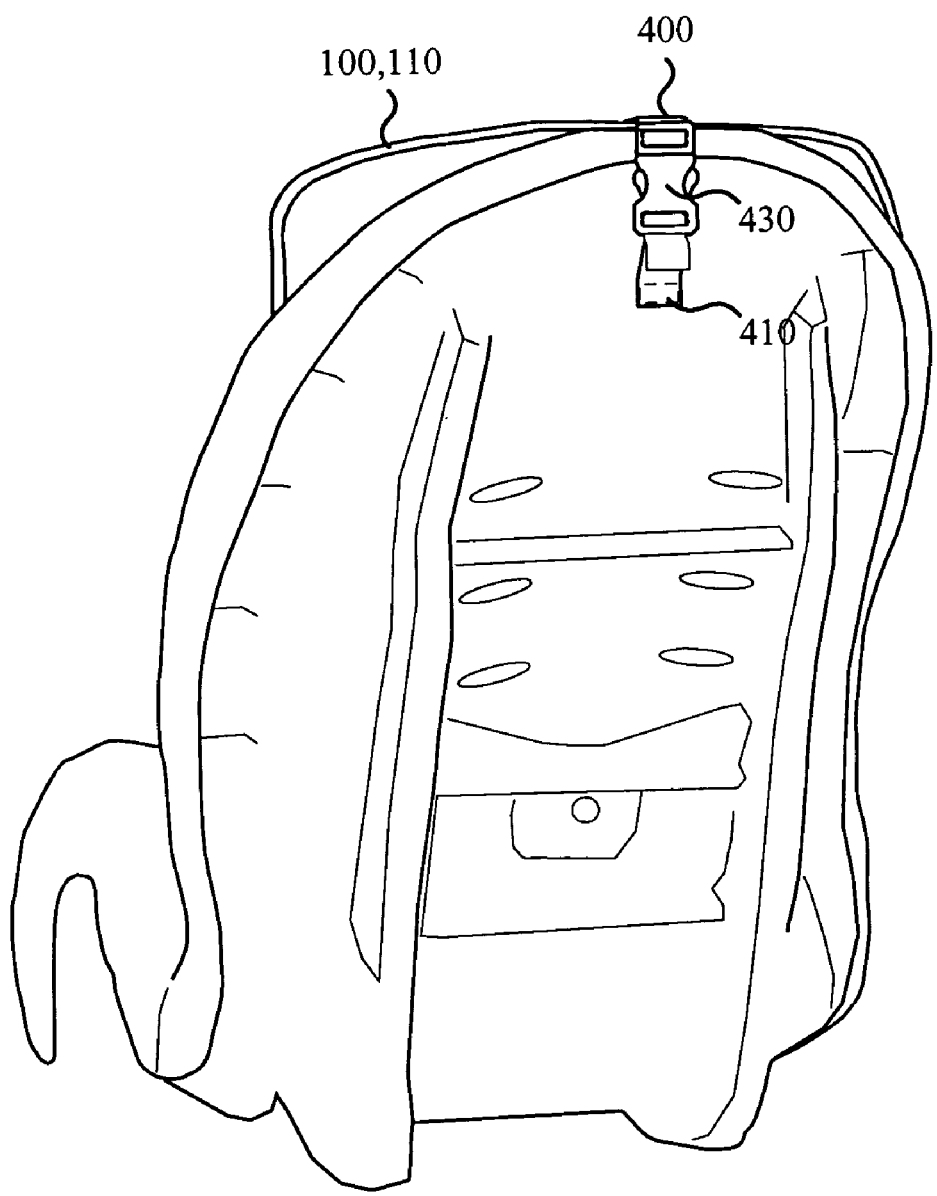
FIG. 5 is a back view illustration of one embodiment of a deployed thermal protection device and associated attachment mechanism of the present invention.

FIG. 5 is a back view illustration showing one embodiment of a deployed thermal protection device 100 and an associated attachment mechanism 400. As shown in the depicted deployment, the sticky pad 410 is used to secure the attachment mechanism 400 at an accessible location near the top of the car seat. The precise deployed position of the flexible barrier 110 may be adjusted by adjusting the length of the attachment mechanism 400 as described in conjunction with FIG. 4. The attachment mechanism 400 may also be used to detach the thermal protection device 100 by separating the buckle 430 into male and female connectors as previously described.

Figure 8:
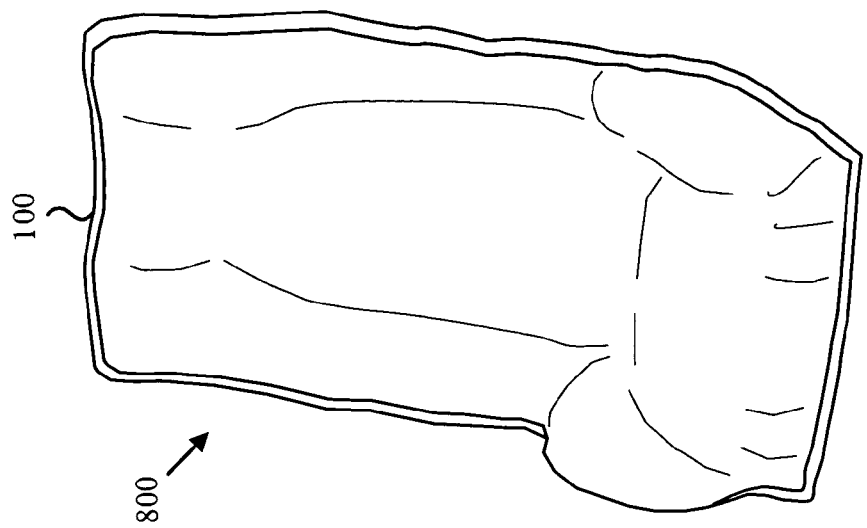
FIG. 8 is a front view illustration of one embodiment of the thermal protection device in a deployed position.
Figure 7:
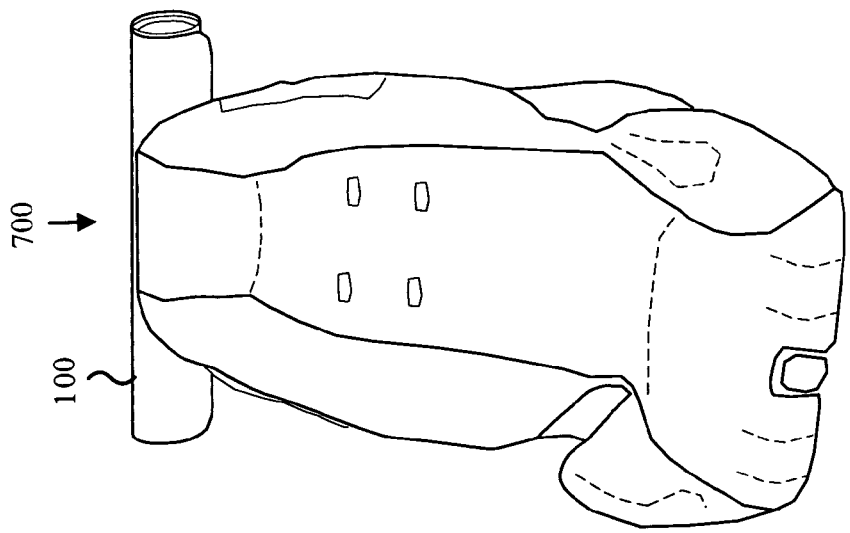
FIG. 7 is a front view illustration of a car seat with one embodiment of the thermal protection device in a second storage position.
Figure 6:
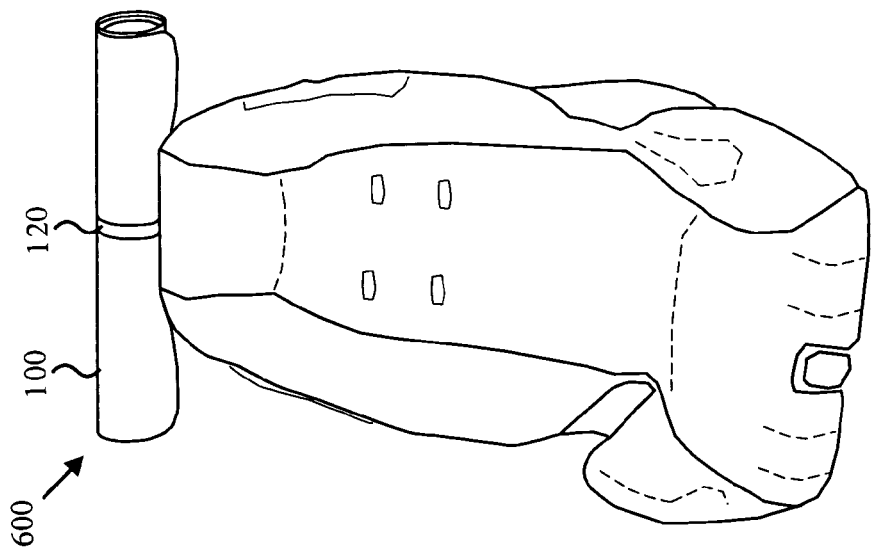
FIG. 6 is a front view illustration of a car seat with one embodiment of the thermal protection device in a first storage position.

FIGS. 6–8 are front view illustrations showing the thermal protection device 100 in a first storage position 600, a second storage position 700, and a deployed position 800, respectively. The depicted first storage position 600 is above the child car seat, while the depicted second storage position 700 is behind the child car seat. The depicted first and second storage positions are shown by way of example in that the precise storage position as well as the deployed position may be adjusted via the attachment strap 420.

The flexible thermal barrier 110 depicted in FIG. 8 is made of supple materials that facilitate draping the thermal protection device 100 over a child car seat. In other embodiments, the flexible thermal barrier 110 is made of less supple materials that facilitate forming a larger air pocket with the interior portion of a child car seat by conforming the flexible thermal barrier 110 to a shape that maintains a large air pocket within the interior portion of a child car seat.

Figure 9:
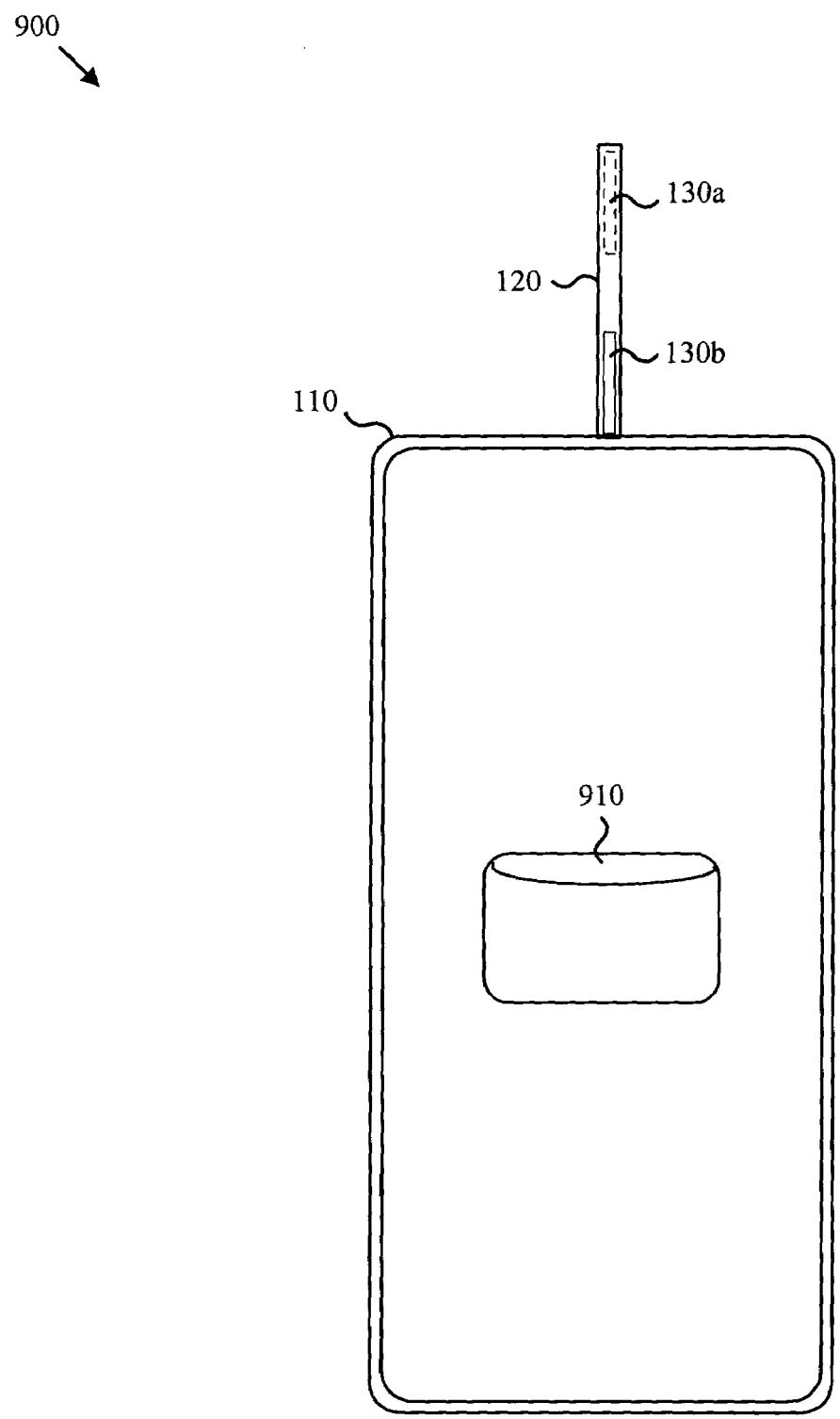
FIG. 9 is a back view illustration of one embodiment of the thermal protection device with a cooling pouch.

FIG. 9 is a back view illustration of one embodiment of a thermal protection device 900 with a temperature moderation pouch 910. In the depicted embodiment, the thermal protection device 900 is similar to the thermal protection device 100 and includes the flexible thermal barrier 110, the positioning strap 120, and other elements described in conjunction with FIG. 1 and elsewhere.

The temperature moderation pouch 910 is preferably shaped to receive and cover a temperature moderation device such as a cold pack or hot pack. The temperature moderation pouch 910 is also preferably made of a waterproof thermally conductive material that protects a child car seat from condensation and facilitates temperature moderation. In one embodiment, the temperature moderation pouch 910 includes a water absorbent lining capable of absorbing condensation on the temperature moderation device.

The temperature moderation pouch 910 preferably faces a child car seat and is positioned to facilitate temperature moderation of buckles and other components of a child car seat that a child is likely to contact. The depicted example is shown with the temperature moderation pouch 910 placed at a position corresponding to the placement of buckles for a typical car seat.

When properly deployed, the temperature moderation pouch, and the device contained therein, moderate the temperature of the air pocket between the child car seat and the flexible thermal barrier 110 generally, and the components of the child car seat in contact with the temperature moderation device specifically. Moderation of the temperature of the airspace between the child car seat and the flexible thermal barrier 110 results in moderation of the interior portion of a child car seat and prevents burning or freezing upon occupation by a child.

Figure 10:
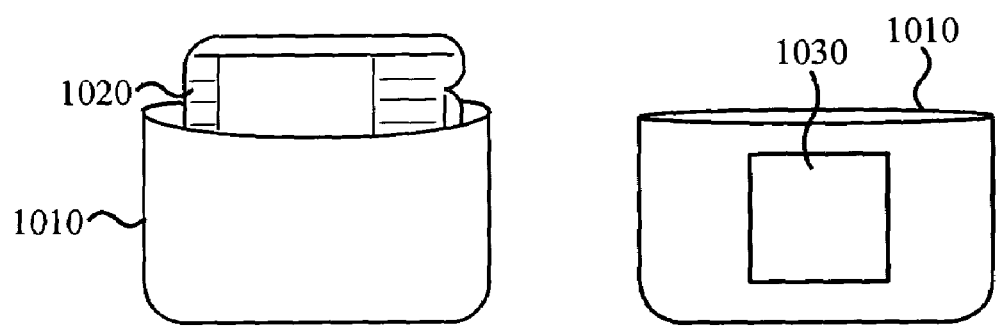
FIG. 10 is an illustration with front and back isometric views of one embodiment of a detachable cooling pouch and associated cooling pack in accordance with the present invention.

FIG. 10 is an illustration with front and back isometric views of one embodiment of a detachable pouch 1010 in accordance with the present invention. A temperature moderation device 1020 is also shown. In the depicted embodiment, the temperature moderation device is a standard cooling pack typically used with picnic coolers. Heating the temperature moderation device 1020 previous to deployment in cold weather and cooling the temperature moderation device 1020 in hot weather increases the effectiveness of a thermal protection device such as the thermal protection device 900.

A fastener 1030 facilitates detachment and attachment of the detachable pouch 1010 with a thermal protection device such as the thermal protection device 900. In the depicted embodiment, the fastener 1030 is a square patch of hook or loop material that mates with a corresponding fastener (not shown) on the thermal protection device 900. The size, shape and position of the fastener 1030 facilitate placing the pouch and temperature moderation device at a position that is in direct contact with components such as buckles or clips that may come in direct contact with an occupant of the child car seat. The fastener 1030 also facilitates removing the detachable pouch 1010 for example when cooling or heating the temperature moderation device 1020.

Figure 11:
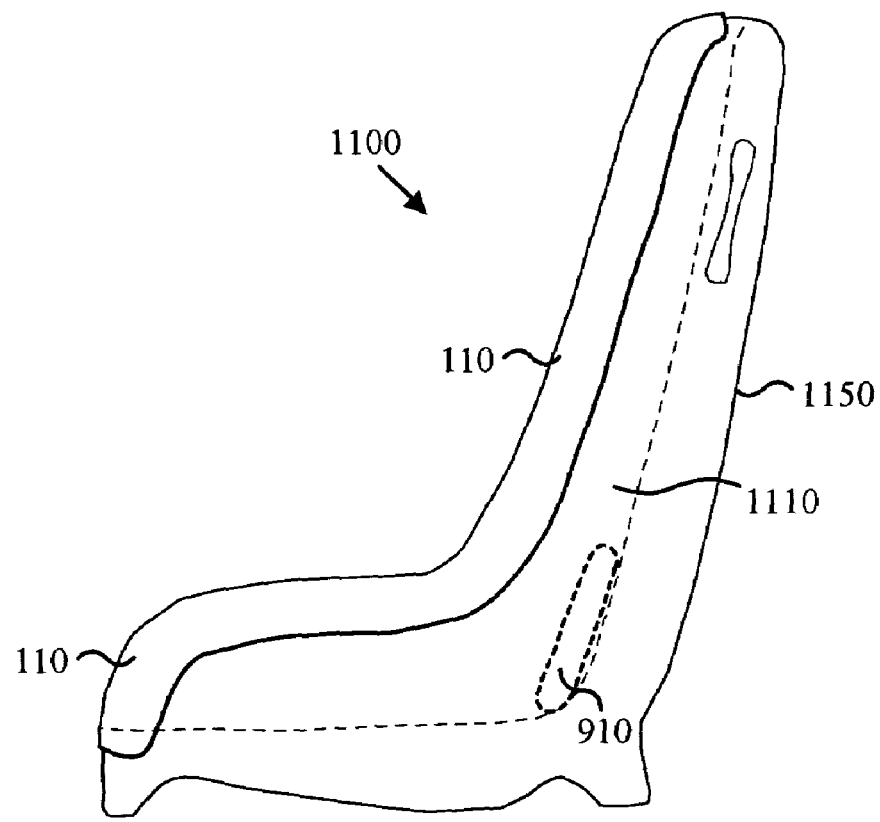
FIG. 11 is a side view illustration of a child car seat with a deployed thermal protection device of the present invention.

FIG. 11 is a side view illustration of a child car seat with a deployed thermal protection device 1100 of the present invention. FIG. 11 illustrates the utility of the present invention. The thermal protection device 1100 is similar to the thermal protection device 900 and includes the flexible thermal barrier 110, the positioning strap 120, and other elements described in conjunction with FIGS. 1 and 9, and elsewhere. For clarity, the positioning strap 120 and the attachment mechanism 400 are not shown and dashed lines are used to indicate hidden lines.

The depicted flexible thermal barrier 110 is somewhat stiff yet flexible enough to conform to the shape of a car seat 1150. In the depicted embodiment, the stiffness of the flexible thermal barrier 110 facilitates forming a large air pocket 1110 that is substantially isolated from the ambient air. The air pocket 1110 increases the thermal protection of the deployed thermal protection device 1100.

To further increase thermal protection, the temperature moderation pouch 910 is shown positioned in contact with the lower back portion of a child car seat. The temperature moderation pouch 910 may be attached to the flexible thermal barrier via the fastener 1030 (not shown) or simply placed unattached at a strategic position as shown. The temperature moderation pouch 910 is preferably placed within the air pocket at a location that facilitates temperature moderation of the interior portion of the child car seat and most preferably in contact with car seat components that may contact an occupant.

The various elements of the present invention work together to provide thermal protection to a child car seat. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for thermally protecting an unoccupied child car seat, the apparatus comprising:

a flexible thermal barrier shaped and sized to substantially cover and thermally protect an interior portion of an unoccupied child car seat, the flexible thermal barrier comprising a first face configured to absorb radiant energy and a second face configured to reflect radiant energy, wherein the flexible thermal barrier is washable and rollable into a storable shape;

a fastening strap connected to the flexible thermal barrier, the fastening strap configured to retain the flexible thermal barrier in the storable shape;

a securement device configured to be secured to a child car seat;

an adjustable attachment strap connected to the securement device, the adjustable attachment strap configured to enable positioning of the flexible thermal barrier in a plurality of storage positions; and a detachable connector comprising a first connection member configured to receive the fastening strap and a second connection member configured to receive the adjustable attachment strap, the first and second connection member configured to detachably connect to each other.

* * * * *